United States Patent Office 3,395,746
Patented Aug. 6, 1968

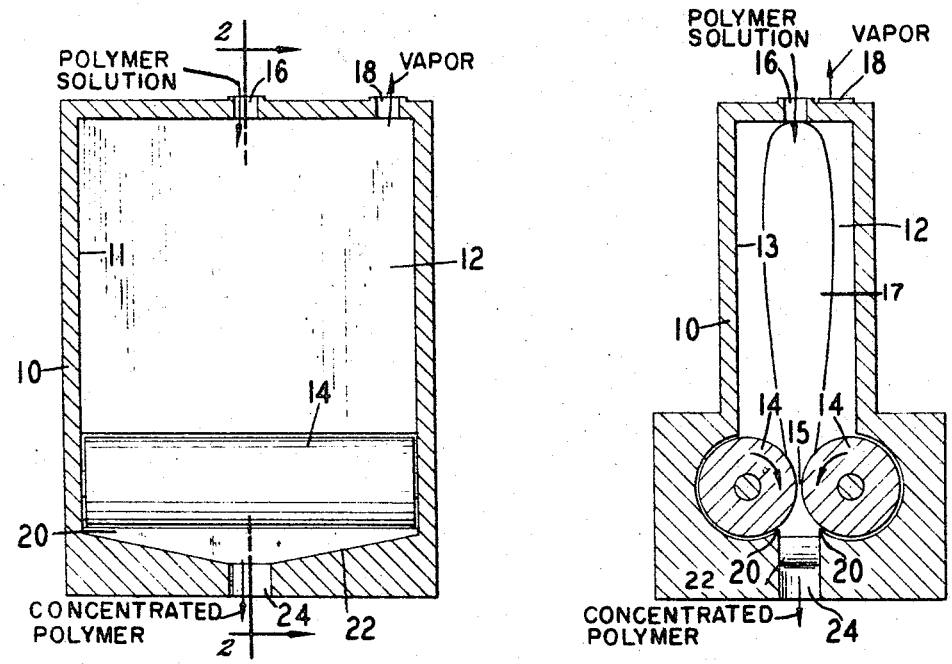
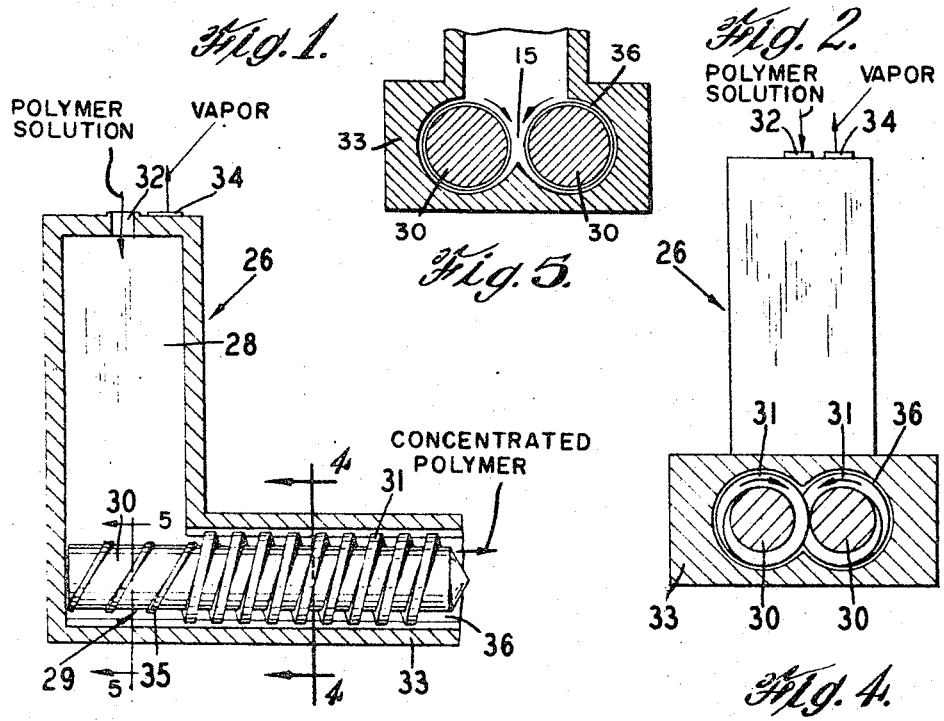
INVENTORS.
TED T. SZABO
FELIX PETER KLOSEK
BY
ATTORNEY

1

3,395,746
METHOD FOR DEVOLATILIZING LIQUID
POLYMER COMPOSITIONS
Ted T. Szabo, Martinsville, and Felix P. Klosek, Neshanic Station, N.J., assignors to Union Carbide Corporation, a corporation of New York
Filed Dec. 13, 1965, Ser. No. 513,422
5 Claims. (Cl. 159—47)

This invention relates to a method for separating polymer from a liquid composition containing polymer and volatile constituents.

In the preparation of polymers as in bulk and solution polymerization or by other conventional methods, considerable amounts of starting materials, such as unreacted monomer or solvent remain admixed or entrained in the polymer product. This contamination of polymer is undesirable because of adverse effects on polymer properties as is well known in the art. A common method of separating the polymer from such fluid compositions is the devolatilization thereof. The composition is heated and introduced into a low pressure chamber to flash vaporize solvent and other volatiles causing foaming of the composition. However, a major difficulty with this method is that considerable vapor is entrapped in the foam and remains with the product. In addition, the cooling caused by vaporization so increases the viscosity of the product that it is difficult to remove the polymer from the flash chamber.

The fluid composition can be further heated to offset this problem; however, heating the mixture to provide for all the heat of vaporization can result in polymer degradation or other undesirable polymer formation.

The addition of a conventional two gear pump to the flash chamber has been employed for product removal. In this arrangement a pair of parallel gears, closely intermeshed, since one drives the other, are situated in the lower part of the flash chamber for receiving the feed composition introduced thereabove. The gears are mounted in working proximity with the chamber walls and rotate upwardly in the zone of intermesh so that the oncoming flashed composition is gathered on the upper surfaces of the gears, thence carried around to be worked between the chamber walls and the moving gear teeth and thereafter carried to the zone of intermesh on the underside of the gears where the flashed product is stripped and pumped out of the chamber. The foamed polymer composition is thus passed between a stationary and a moving surface. The result is that such pumps can not process the polymer to better than 90% solids because, at increased viscosities the polymer composition does not flow between the gear teeth and tends to adhere to and hang up on the chamber walls causing bridging thereof and blocking of the system.

Accordingly, it is an object of the present invention to provide a method for removing volatiles from a viscous fluid polymer composition to obtain a liquid polymer product of substantially better than 90% solids.

This and other objects are accomplished by the present invention which provides a method for separating volatiles from a liquid composition containing polymer and volatile constituents comprising introducing said composition to the upper portion of a chamber maintained at a reduced pressure to flash-vaporize said volatiles and foam the resulting composition thus releasing a substantial amount of volatiles therefrom and concurrently forming a foamy strand of polymer freely descending within said chamber substantially out of contact with the walls thereof, contacting said descending strand with the surfaces of a pair of counter rotating rollers having equal angular velocities located within the lower part of said chamber

2 and having a nip clearance in excess of the necessary mechanical clearance thereof and less than the thickness of said strand; each of said surfaces at the zone of contact moving generally with the flow of the approaching strand to draw said strand into and through the nip of said rollers to compress said strand effecting the further release of volatiles therefrom and conveying the devolatilized polymer composition from said chamber.

The invention will become more apparent from the following detailed specification and drawings, in which:

FIGURE 1 is a sectional elevation view of an apparatus suitable for carrying out the method of the present invention.

FIGURE 2 is a sectional side elevation view of the apparatus of FIGURE 1 taken on line 2—2.

FIGURE 3 is a section elevation view of another embodiment of an apparatus suitable for carrying out the process of the present invention, and FIGURE 4 is a sectional elevation view of the apparatus of FIGURE 3 taken on line 4—4.

Referring now to the drawings, a liquid polymer composition (not shown) heated to a suitable devolatilization temperature is introduced to low pressure chamber 12, of the housing 10, shown in FIGURES 1 and 2, through feed port 16 whereupon the composition flash devolatilizes and forms a foamy strand 17 which descends out of contact with the chamber walls 11 and 13 to the rollers 14 situated therebelow. Vapor outlet 18 is adapted to communicate with evacuating means (not shown) for maintaining the pressure in the chamber 12 below the vapor pressure of the solution introduced thereto and also for conveying away the resulting vapors therethrough as shown in FIGURES 1 and 2. The rollers 14 are rotated as indicated by the arrows in FIGURE 2 i.e., in the direction of flow of the oncoming foamy strand, so as to gather in the strand and compress and compact the foam in the nip 15, thereof for further vapor release. Barriers 20, shown in FIGURES 1 and 2, mounted in close proximity with the rollers 14, serve to strip the compacted polymer composition therefrom and the composition, a viscous liquid, issues from the chamber by way of ramp 22 and product outlet 24. If desired a pump (not shown) can be connected with product outlet 24 to assist the rolls 14 in pumping out the product when, for example, the chamber is under high vacuum.

The process of the present invention can be carried out by other apparatus such as that shown in FIGURES 3 and 4. As indicated in FIGURE 3 a fluid polymer composition is introduced to the low pressure chamber 28 of the housing 26 through feed port 32 to form a foamy strand as described above. The chamber 28 is maintained at a reduced pressure by evacuating means (not shown) connected with vapor outlet 34. Twin screws 29 are rotated as indicated by the arrows in FIGURE 4 and the oncoming foamy strand is gathered in at the roller portion 30 of the screws 29 and compacted as before. The roller portion 30 can optionally be provided with surface irregularities, for example, threads 35 which serve to conduct the foamy strand toward threads 31 of the screws 29 as it is being compacted. Thereafter, the compacted polymer composition is gathered by the threads 31 and conveyed or extruded from the chamber 28 at product outlet 34 as indicated in FIGURES 3 and 4. The lower portion 33 of the housing 26 is contoured to the profile of the screws as shown in FIGURE 4 to assure virtually complete product removal.

By the method of the present invention a liquid composition as dilute as 50% by weight polymer can be processed to substantially solvent-free polymer having less than 2% and frequently less than 1% by weight of solvent or other volatile therein. For example, polystyrene solution containing 50% by weight of the polymer in unreacted monomer can be processed to 99.9% by weight of the polymer.

The fluid polymer composition can be composed of virtually any polymeric material such as polystyrene, polypropylene, polyethylene vinyl polymers and the like dissolved in a suitable solvent such as its monomer, or inert liquids such as benzene, toluene, heptane, acetone and the like.

The polymer composition can be fed to the low pressure chamber at varying rates depending on such factors as the nature of the feed materials, the feed temperature, pressure in the chamber, speed of the rollers, size of the equipment and the like. Example 1 appearing hereinbelow serves as an illustration of a combination of such factors which can be readily determined by the skilled practitioner in accordance with process demands.

The fluid composition is fed to the low pressure chamber or vapor-liquid separation zone at temperature sufficient to cause vigorous devolatilization thereof when the feed enters the chamber but below the temperature at which the particular solution components degrade or are otherwise adversely affected. The solution is preferably maintained at a pressure sufficiently high to prevent boiling thereof in the feed lines by throttle valves, for example, mounted in the lines adjacent to the chamber. However, extensive boiling in the lines can occur without materially affecting the vapor-liquid separation in the chamber.

The pressure in the chamber is maintained below the vapor pressure of the feed solution and preferably well below the feed pressure to provide a substantial pressure drop and flash vaporization of volatiles such as the solvent or solvents thereof, with resultant vigorous foaming of the solution. The temperature of the chamber is preferably sufficiently high to maintain the solution product in a liquid state as well as vaporize the solvent component. The chamber temperature is determined by diverse factors, for example, by its maintained pressure and the thermal properties of the feed solution which upon entering expands and cools.

Although the chamber pressure varies depending upon the particular solvents or other volatiles being vaporized, it has been found that pressures in the range of from about 10 to about 300 mm. Hg are generally suitable; the lower end of the range being preferred.

A conventional vacuum pump or other suitable evacuating means, connected, for example, to the upper portion of the chamber by way of a vapor outlet, can be conveniently employed in the present invention. A condenser can be connected to the vacuum pump, e.g., for recovery of the stripped volatiles. However, when a low boiling solution is fed to the chamber, for example, under high temperature and pressure, evacuating means can appropriately be dispensed with in accordance with process requirements.

The moving surfaces which mechanically compress the foamy polymer strand are of rigid material such as metal, for example, stainless steel. Such surfaces are preferably those of rollers as indicated.

The rollers can each have a smooth or irregular surface composed, for examples, of gear teeth or threads. The rollers or belts are mounted to provide, at their nip, a mechanical clearance in excess of the necessary mechanical clearance thereof and less than the thickness of the polymer strand descending thereto.

Preferably, one pair of rollers is employed for compression of the foamy polymer strand. However, where desired, several succeeding pairs of rollers can be used, one pair above the other, with each pair rotating as indicated, for example, in FIGURE 2 of the drawings so that the roller surfaces at the respective nips thereof rotate in the direction of flow of the foamy strand. Provision for suitable vapor removal between each pair of rollers, as a vacuum port, can also be made.

The rollers can be rotated at any suitable speed of up to about 300 r.p.m. or more in accordance with process and mechanical requirements.

The product is removed from the chamber by the pumping action of the rollers as indicated, or additionally by a suitable auxiliary pump or by other means, for example, twin screws as indicated in FIGURES 3 and 4. Other types of screws can also be employed such as a pair of screws each having a roller portion in the middle thereof and threads at both ends thereof, so that the compacted product composition is conveyed from the low pressure chamber in two directions and thus out two product outlets. The screws can have various shaped threads, from angular to rounded. Moreover the screws can be spaced so that the adjacent threads thereof intermesh or are themselves spaced in close proximity. By positioning the screws with the threads thereof in close proximity, shear and further compression can be exerted on the already compacted composition for further vapor release. Vacuum ports can be provided in the screw channel to carry off the thus released vapors.

Preferably, the fluid polymer composition, after entering the low-pressure chamber and forming a foamy strand descending therein, comes into contact only with the moving surfaces of the rollers until after compression in the nip thereof to assure even rapid flow through the devolatilization system. However, it will be recognized that at least some of the foamed polymer composition can come into contact with the chamber walls en route to mechanical compression without appreciably detracting from the process of the invention as long as the substantial bulk of the foamy strand falls directly to the above moving surfaces.

The following example is intended as an illustration of the invention and should not be construed in limitation thereof.

Example I

A solution of polystyrene in its monomer was devolatilized in an apparatus similar to that shown in FIGURES 3 and 4. The screws had a root diameter of 1 inch, a crest diameter of 2 inches and a thread thickness of about ½ inch. The length of the compression zone, i.e., the roller portion of the screws, was 1 inch and the length of the threaded portion thereof was 6 inches. Examples were run as indicated in the following table, the screws being rotated at 100 r.p.m.

TABLE I

| | | Flash Chamber | | Percent Polystrene on Feed | Percent Polystyrene in Product |
| --- | --- | --- | --- | --- | --- |
| | Feed Rate, lbs./hr. | Feed Temperature, °C. | Pressure, mm. Hg | | |
| Example: | | | | | |
| 1 | 50.6 | 172 | 100 | 80 | 98.15 |
| 2 | 95.9 | 175 | 100 | 80 | 97.86 |
| 3 | 91.2 | 178 | 90 | 80 | 98.63 |

Thus it is apparent that the process of the invention serves to provide substantially volatile-free polymer. The percent polymer in the product can be raised by adjustments of the tabulated variables such as lowering the chamber pressure or increasing the temperature of the feed or other means such as increasing the size of the apparatus components as can be readily determined by the skilled practitioner for a given polymer composition to produce a product of up to 99.9% polymer or more.

Moreover, the polymer product can, where suitable, be reprocessed, i.e., subjected to flashing and compression two or more times.

The product after issuing from the devolatilization stage can then be advanced to a conventional milling stage, if desired, such as a single or multiple screw vented extruder to obtain virtually pure polymer.

What is claimed is:

1. A method for separating volatiles from a liquid composition containing polymer and volatile constituents comprising introducing said composition to the upper portion of a chamber maintained at a reduced pressure to flash-vaporize said volatiles and foam the resulting composition thus releasing a substantial amount of volatiles therefrom and concurrently forming a foamy strand of polymer freely descending within said chamber substantially out of contact with the walls thereof, passing said descending strand through a substantially shear-free compression zone located in the lower part of the chamber, said compression zone being defined by a pair of counter rotating rollers having equal angular velocity and a nip clearance in excess of the necessary mechanical clearance thereof and less than the thickness of said strand; each of said surfaces at the zone of contact moving generally with the flow of the approaching strand to draw said strand into and through the nip of said rollers to mechanically compress said strand effecting the further release of volatiles therefrom and conveying the devolatilized polymer composition from said chamber.

2. The process of claim 1 wherein said devolatilized polymer composition is extruded from said chamber by a pair of counter rotating screws coaxial and integrated with the rollers.

3. The process of claim 1 wherein said devolatilized polymer composition undergoes shear and further compression between said pair of counter rotating screws mounted in close proximity with one another before being removed from said chamber by said screws.

4. The process of claim 1 wherein said devolatilized polymer composition is subsequently passed through a milling stage.

5. The process of claim 1 wherein said polymer contains polystyrene.

References Cited

UNITED STATES PATENTS

| | | | |
|---|---|---|---|
| 3,156,009 | 11/1964 | Alsys | 18—12 |
| 3,201,365 | 8/1965 | Charlesworth et al. | 159—13 X |
| 3,208,506 | 9/1965 | Angstadt et al. | 159—12 |
| 2,857,625 | 10/1958 | Carlson | 264—53 |
| 2,945,262 | 7/1960 | Aykanian et al. | 264—53 |
| 2,439,384 | 4/1948 | Fetzer | 159—47 X |
| 2,455,174 | 11/1948 | Hitt | 18—54 |
| 2,719,776 | 10/1955 | Kummel | 159—3 X |
| 2,728,939 | 1/1956 | Behr | 18—1 |
| 2,782,843 | 2/1957 | Rodenacker | 159—12 X |
| 3,072,626 | 1/1963 | Cines | 260—93.5 |
| 3,085,288 | 4/1964 | Street | 18—12 |
| 3,149,056 | 9/1964 | Longstreth et al. | 159—13 X |

NORMAN YUDKOFF, *Primary Examiner.*

J. SOFER, *Assistant Examiner.*